I. D. Vandecar.
Dredger.
Nº 64,168. Patented Apr. 23, 1867.
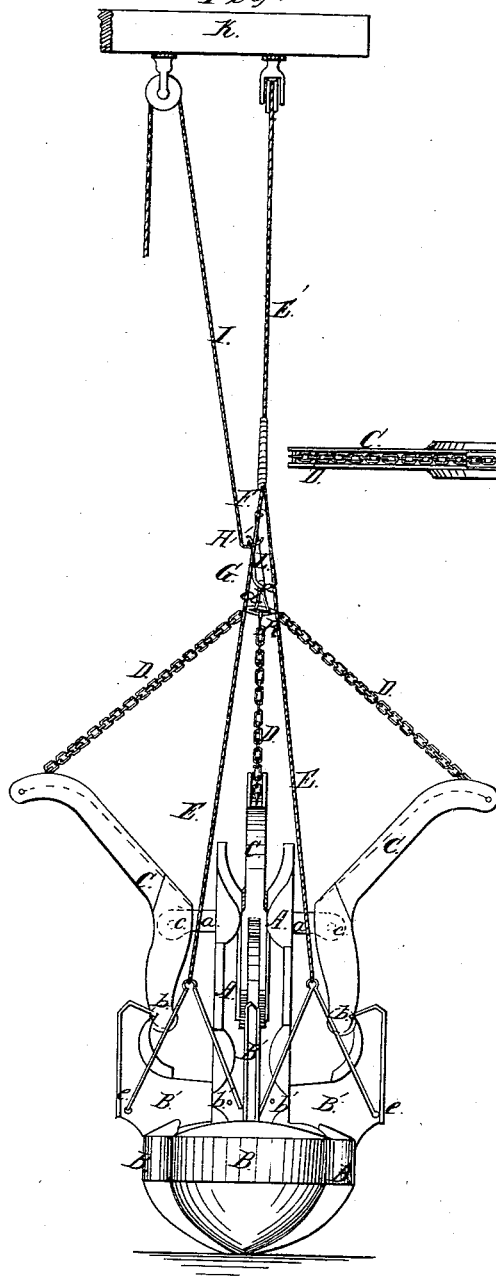
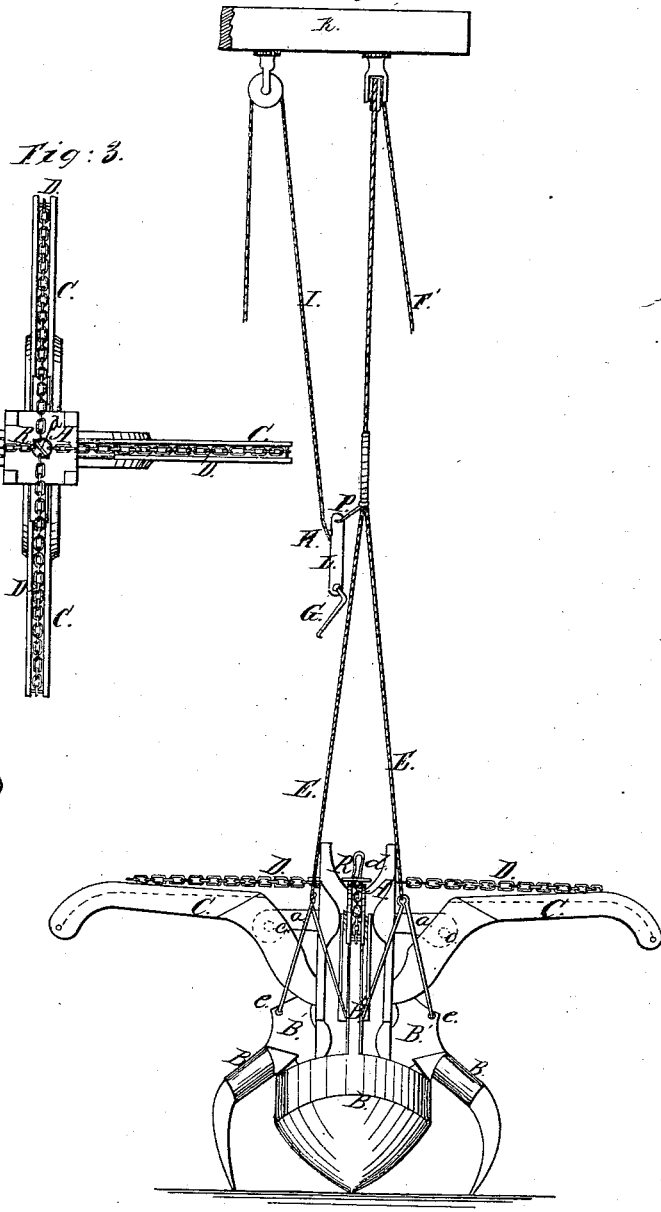
Witnesses:
Inventor:
Israel D. Vandecar.

United States Patent Office.

ISRAEL D. VANDECAR, OF CHICAGO, ILLINOIS.

*Letters Patent No. 64,168, dated April 23, 1867.*

---

IMPROVED EXCAVATOR.

---

*The Schedule referred to in these Letters Patent and making part of the same.*

---

TO ALL WHOM IT MAY CONCERN:

Be it known that I, ISRAEL D. VANDECAR, of Chicago, in the county of Cook, and State of Illinois, have invented a new and useful improvement in Excavators; and I do hereby declare and make known that the following is a full, clear, and exact description of the same, reference being had to the accompanying drawings and the letters and figures marked thereon, which form part of this specification.

To enable those skilled in the art to understand how to construct and use my invention I will proceed to describe the same with particularity, making reference in so doing to the aforesaid drawings, in which—

Figure 1 represents my invention when loaded and ready to be elevated.

Figure 2, a view of the same when ready to grasp the earth or soil to be excavated; and Figure 3 is a plan or top view of my improved excavator.

Similar letters of reference in the several figures denote the same parts of my invention.

A represents a short vertical post, to which are attached the shovels B and the arms C, hereinafter described, as is hereinafter specified. There are four shovels B, arranged in pairs, opening from, and closing toward, each other, as hereinafter set forth, being provided with shanks B', which enter into suitable recesses in the lower end of the vertical post A, wherein they are secured or pivoted, as shown at $b'$ in fig. 1. To the upper end of said post are fixed projections or arms $a$, to which are pivoted, at $c$, the arms C, corresponding in number and arrangement with the four shovels aforesaid, the lower ends of said arms being furnished, if desired, with anti-friction rollers $b$, which slide down upon the interior faces of the shovel shanks B', as hereinafter more fully described. The upper and outer ends of the said arms C are connected by the chains D, which unite in the centre in a ring, R, to which is affixed a link, $d$. To the shovel shanks B', outside of the vertical line passing through the points where the said shanks are pivoted or hinged to the post A, are attached links, or rods, or chains, at $e$, which are connected by dumping ropes or chains E, which unite in one, E', and pass over a suitable sheave or pulley upon a crane-arm or derrick, K, to be raised when desired. To the ropes or chains E, at or near their junction, is attached a bar, L, by a link, F. To the lower end of said bar L is attached a bent rod or latch, while near the upper end is a small link, H, having attached thereto a cord or chain, I, which passes over a pulley upon the crane, as shown.

Having described the construction of my invention, I will now proceed to describe the operation of the same. The apparatus is lowered to the point where the earth or soil is to be removed, as shown in fig. 2, the entire weight thereof being supported upon the chains or ropes E. The link L is then drawn down, and the hook G is passed through the link $d$, and folded back, and the ring or catch H is slipped over the end of the hook G, thus firmly securing the hoisting rope E' to the ring R, in which the chains D unite, as shown, leaving the chains E slack. The power is then applied upon the hoisting rope E', whose tension first operates to clasp the shovels together, as seen in fig. 1, thereby grasping the earth and holding it in the receptacle thus formed. As the hoisting continues the entire apparatus thus closed is raised to the desired height, and the arm K swung around until the shovels are brought over the place where the earth is to be discharged, when a pull upon the cord I raises the ring H from the end of the hinged hook L G, when the link $d$ is at once detached, the shovels open, and their contents are at once discharged, as desired. The machine is then lowered to the proper position, the hook G again attached to the ring R, as before, and the operation is repeated.

Having described the construction and operation of my invention, I will now specify what I claim, and desire to secure by Letters Patent:

1. I claim the combination and arrangement of the shovels B, provided with the shanks B', the levers C, arms $a$, and the post A, when arranged and operating substantially as described.

2. In combination with the shovels B, provided with the shanks B', the levers C, arms $a$, and post or centre-piece A, I claim the connecting chains D, hoisting rope E', and dumping ropes E, when all arranged and operating substantially as and for the purposes set forth.

ISRAEL D. VANDECAR.

Witnesses:
W. E. MARRS,
J. C. IRWIN.